(12) United States Patent
Cawthorne et al.

(10) Patent No.: US 8,155,815 B2
(45) Date of Patent: Apr. 10, 2012

(54) METHOD AND APPARATUS FOR SECURING OUTPUT TORQUE IN A DISTRIBUTED CONTROL MODULE SYSTEM FOR A POWERTRAIN SYSTEM

(75) Inventors: William R. Cawthorne, Milford, MI (US); Hanne Buur, Brighton, MI (US); Paul A Stanowski, Trenton, MI (US)

(73) Assignees: GM Global Technology Operation LLC, Detroit, MI (US); Daimler AG, Stuttgart (DE); Chrysler LLC, AuburnHIlls, MI (US); Bayerische Motoren Werke Aktiengesellschaft, Munich (DE)

( * ) Notice: Subject to any disclaimer, the term of this patent is extended or adjusted under 35 U.S.C. 154(b) by 710 days.

(21) Appl. No.: 12/245,837

(22) Filed: Oct. 6, 2008

(65) Prior Publication Data
US 2009/0118901 A1 May 7, 2009

Related U.S. Application Data

(60) Provisional application No. 60/985,641, filed on Nov. 5, 2007.

(51) Int. Cl.
*G01M 17/00* (2006.01)
*B60L 9/00* (2006.01)
*B60W 10/00* (2006.01)
(52) U.S. Cl. .......... 701/29; 701/22; 180/65.265
(58) Field of Classification Search ............ 701/22, 701/29, 35; 180/65.265, 65.28, 65.285
See application file for complete search history.

(56) References Cited

U.S. PATENT DOCUMENTS

| 6,490,511 | B1 * | 12/2002 | Raftari et al. ............ 701/22 |
| 6,502,019 | B1 * | 12/2002 | Zydek et al. ............. 701/29 |
| 6,668,795 | B1 * | 12/2003 | Shimada ................ 123/350 |
| 6,832,148 | B1 | 12/2004 | Bennett |
| 6,868,318 | B1 | 3/2005 | Cawthorne |
| 6,976,388 | B2 * | 12/2005 | Heap et al. ............. 73/115.02 |
| 7,154,236 | B1 | 12/2006 | Heap |
| 2005/0076958 | A1 | 4/2005 | Foster |
| 2005/0077867 | A1 | 4/2005 | Cawthorne |
| 2005/0077877 | A1 | 4/2005 | Cawthorne |
| 2005/0080523 | A1 | 4/2005 | Bennett |
| 2005/0080527 | A1 | 4/2005 | Tao |
| 2005/0080535 | A1 | 4/2005 | Steinmetz |
| 2005/0080537 | A1 | 4/2005 | Cawthorne |
| 2005/0080538 | A1 | 4/2005 | Hubbard |
| 2005/0080539 | A1 | 4/2005 | Hubbard |
| 2005/0080540 | A1 | 4/2005 | Steinmetz |
| 2005/0080541 | A1 | 4/2005 | Sah |
| 2005/0182526 | A1 | 8/2005 | Hubbard |
| 2005/0182543 | A1 | 8/2005 | Sah |
| 2005/0182546 | A1 | 8/2005 | Hsieh |
| 2005/0182547 | A1 | 8/2005 | Sah |
| 2005/0189918 | A1 | 9/2005 | Weisgerber |
| 2005/0252283 | A1 | 11/2005 | Heap |
| 2005/0252305 | A1 | 11/2005 | Hubbard |
| 2005/0252474 | A1 | 11/2005 | Sah |
| 2005/0255963 | A1 | 11/2005 | Hsieh |
| 2005/0255964 | A1 | 11/2005 | Heap |
| 2005/0255965 | A1 | 11/2005 | Tao |

(Continued)

*Primary Examiner* — Darnell M Jayne
*Assistant Examiner* — Andrew Roersma

(57) ABSTRACT

A method to monitor integrity of a motor torque command for a transmission in a hybrid powertrain system includes calculating motor torque commands for the torque generating machines. Torque corrections for the motor torque commands are determined. The motor torque commands are adjusted based upon the torque corrections. The adjusted motor torque commands are verified based upon an estimated output torque.

13 Claims, 4 Drawing Sheets

U.S. PATENT DOCUMENTS

| | | |
|---|---|---|
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0255463 A1* | 11/2007 | Kikuchi .................. 701/22 |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |

| | | | | | | |
|---|---|---|---|---|---|---|
| 2009/0118937 A1 | 5/2009 | Heap | | 2009/0118950 A1 | 5/2009 | Heap |
| 2009/0118938 A1 | 5/2009 | Heap | | 2009/0118951 A1 | 5/2009 | Heap |
| 2009/0118939 A1 | 5/2009 | Heap | | 2009/0118952 A1 | 5/2009 | Heap |
| 2009/0118940 A1 | 5/2009 | Heap | | 2009/0118954 A1 | 5/2009 | Wu |
| 2009/0118941 A1 | 5/2009 | Heap | | 2009/0118957 A1 | 5/2009 | Heap |
| 2009/0118942 A1 | 5/2009 | Hsieh | | 2009/0118962 A1 | 5/2009 | Heap |
| 2009/0118943 A1 | 5/2009 | Heap | | 2009/0118963 A1 | 5/2009 | Heap |
| 2009/0118944 A1 | 5/2009 | Heap | | 2009/0118964 A1 | 5/2009 | Snyder |
| 2009/0118945 A1 | 5/2009 | Heap | | 2009/0118969 A1 * | 5/2009 | Heap et al. .................. 701/102 |
| 2009/0118946 A1 | 5/2009 | Heap | | 2009/0118971 A1 | 5/2009 | Heap |
| 2009/0118947 A1 | 5/2009 | Heap | | 2009/0118999 A1 | 5/2009 | Heap |
| 2009/0118948 A1 | 5/2009 | Heap | | 2009/0144002 A1 | 6/2009 | Zettel |
| 2009/0118949 A1 | 5/2009 | Heap | | | | |

* cited by examiner

METHOD AND APPARATUS FOR SECURING OUTPUT TORQUE IN A DISTRIBUTED CONTROL MODULE SYSTEM FOR A POWERTRAIN SYSTEM

CROSS REFERENCE TO RELATED APPLICATIONS

This application claims the benefit of U.S. Provisional Application No. 60/985,641, filed on Nov. 5, 2007 which is hereby incorporated herein by reference.

TECHNICAL FIELD

This disclosure pertains to control systems for hybrid powertrain systems.

BACKGROUND

The statements in this section merely provide background information related to the present disclosure and may not constitute prior art.

Known hybrid powertrain architectures can include multiple torque-generative devices, including internal combustion engines and non-combustion machines, e.g., electric machines, which transmit torque through a transmission device to an output member. One exemplary hybrid powertrain includes a two-mode, compound-split, electromechanical transmission which utilizes an input member for receiving tractive torque from a prime mover power source, preferably an internal combustion engine, and an output member. The output member can be operatively connected to a driveline for a motor vehicle for transmitting tractive torque thereto. Machines, operative as motors or generators, can generate torque inputs to the transmission independently of a torque input from the internal combustion engine. The machines may transform vehicle kinetic energy transmitted through the vehicle driveline to energy that is storable in an energy storage device. A control system is operative to monitor various inputs from the vehicle and the operator and provides operational control of the hybrid powertrain, including controlling transmission operating state and gear shifting, controlling the torque-generative devices, and regulating the power interchange among the energy storage device and the machines to manage outputs of the transmission, including torque and rotational speed. A control system can monitor input and control signals and execute algorithms to verify and secure operation of the powertrain.

SUMMARY

A hybrid powertrain system includes a control module, a transmission, and a plurality of torque generating machines connected to an energy storage device. The transmission is operative to transfer power between an input member and the torque generating machines and an output member. A method to monitor signal integrity in the control module includes determining an output torque command, calculating motor torque commands for the torque generating machines based upon the output torque command, determining torque corrections for the motor torque commands, adjusting the motor torque commands based upon the torque corrections for the motor torque commands, determining an input torque correction based upon the torque corrections for the motor torque commands, determining an actual input torque to the input member, estimating an output torque based upon the actual input torque, the input torque correction, and the adjusted motor torque commands, and comparing the estimated output torque and the output torque command.

BRIEF DESCRIPTION OF THE DRAWINGS

One or more embodiments will now be described, by way of example, with reference to the accompanying drawings, in which.

DETAILED DESCRIPTION

Figure 1:
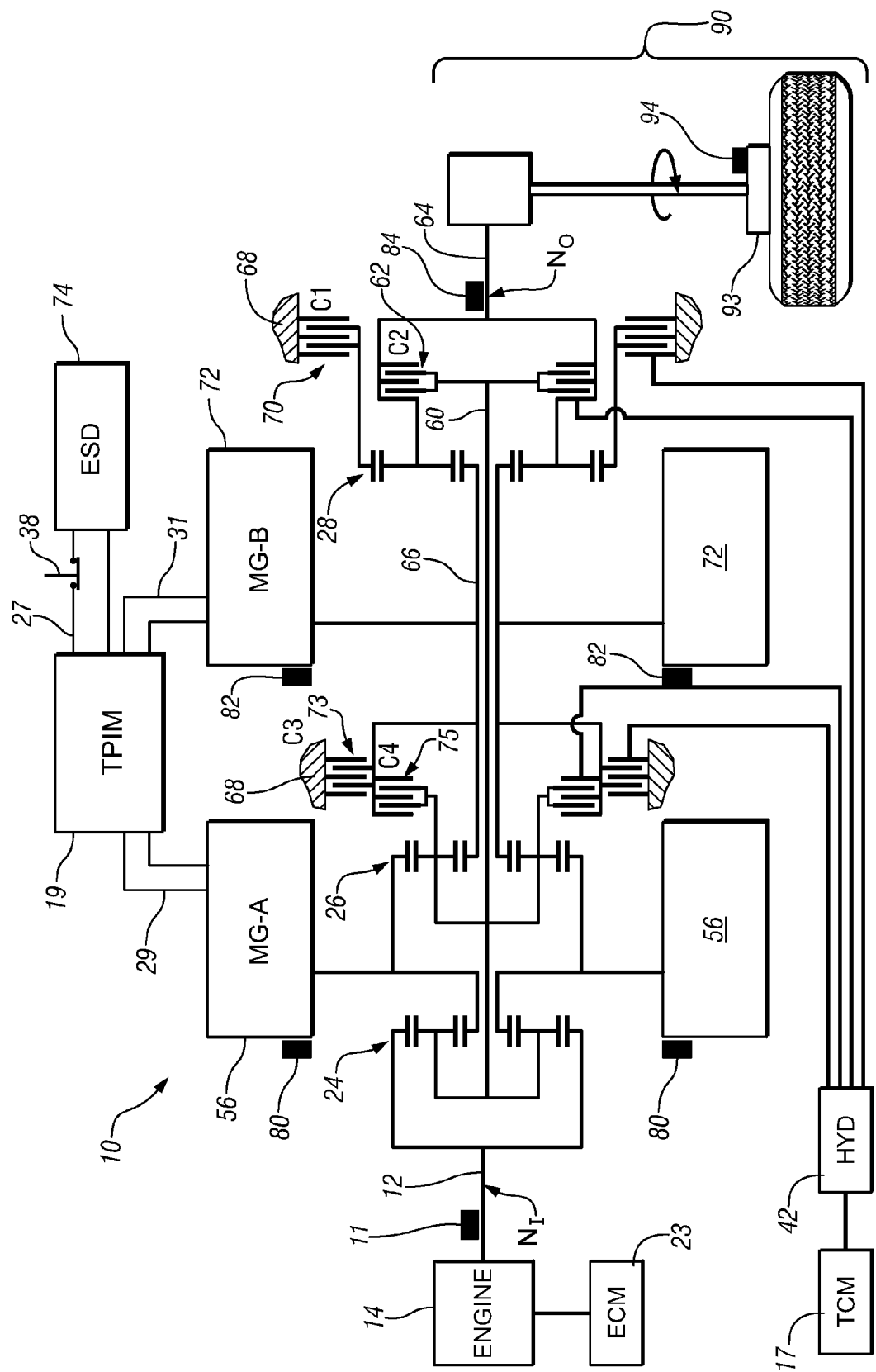
FIG. 1 is a schematic diagram of an exemplary hybrid powertrain, in accordance with the present disclosure.
Figures 2, 3:
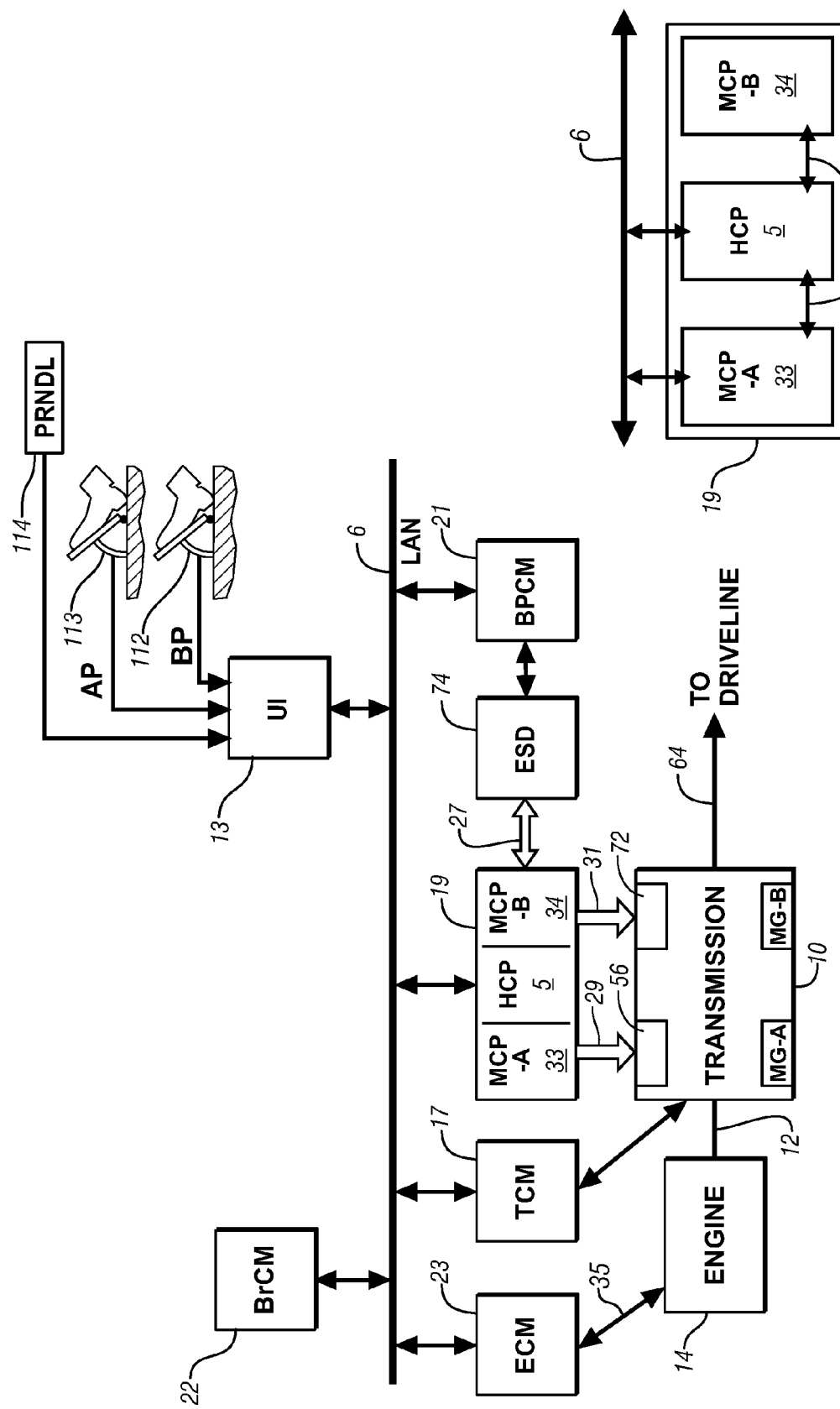
FIGS. 2 and 3 are schematic diagrams of an exemplary architecture for a control system and hybrid powertrain, in accordance with the present disclosure.

Referring now to the drawings, wherein the showings are for the purpose of illustrating certain exemplary embodiments only and not for the purpose of limiting the same, FIGS. 1, 2 and 3 depict an embodiment of an electromechanical hybrid powertrain and associated control system. The exemplary electromechanical hybrid powertrain in accordance with the present disclosure is depicted in FIG. 1, comprising a two-mode, compound-split, electromechanical hybrid transmission 10 operatively connected to torque generating devices including an engine 14 and first and second electric machines ('MG-A') 56 and ('MG-B') 72. The engine 14 and first and second electric machines 56 and 72 each generate mechanical power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input member 12, and can be either a spark-ignition or a compression-ignition engine. The engine 14 includes a crankshaft (not shown) operatively coupled to the input member 12 of the transmission 10. A rotational speed sensor 11 monitors rotational speed of the input member 12. Power output from the engine 14, comprising rotational speed and engine torque, can differ from the input speed $N_I$ and the input torque $T_I$ to the transmission 10 due to placement of torque-consuming components on the input member 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit ('HYD') 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 through a first motor control module ('MCP-A') 33 using transfer conductors 29, and the TPIM 19 similarly transmits electrical power to and from the second electric machine 72 through a second motor control module ('MCP-B') 34 using transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 preferably includes a hybrid control module (hereafter 'HCP') 5 and the pair of power inverters and respective motor control modules 33 and 34 configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIGS. 2 and 3 are schematic block diagrams of an embodiment the distributed control module system of the control system. As used herein, the term 'control system' is defined as the control modules, wiring harnesses (not shown), communications links, sensors and actuators that monitor and control operation of the powertrain system. The control system monitors sensor inputs and commands outputs for controlling the actuators. The distributed control module system comprises a subset of overall vehicle control architecture, and provides coordinated system control of the exemplary hybrid powertrain described in FIG. 1. The control system includes the distributed control module system for synthesizing information and inputs, and executing algorithms to control actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. The HCP 5 provides supervisory control and coordination of the ECM 23, the TCM 17, the BPCM 21, and the TPIM 19. A user interface ('UI') 13 is preferably signally connected to a plurality of devices through which a vehicle operator controls, directs, and commands operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction. The user interface 13 can comprise a single device, as shown, or alternatively can comprise a plurality of user interface devices directly connected to the individual control modules (not shown).

The aforementioned control modules communicate with other control modules, sensors, and actuators via a communications link comprising a local area network (hereafter 'LAN') bus 6, in this embodiment. The LAN bus 6 allows for structured communication between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communications between the MCP-A 33 and the HCP 5 and between the MCP-B 34 and the HCP 5 is preferably effected using direct links preferably comprising serial peripheral interface (hereafter 'SPI') buses 37. Communication between individual control modules can also be effected using a wireless link, e.g., a short range wireless radio communications bus (not shown).

The HCP 5 provides supervisory control of the hybrid powertrain, serving to coordinate operation of the ECM 23, TCM 17, MCP-A 33, MCP-B 34, and BPCM 21. Based upon various command signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The HCP 5 sends commands to specific control modules to effect control of the engine 14, transmission 10 and the first and second electric machines 56 and 72.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input member 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates control signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates actuator control signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, HCP-5, MCP-A 33, MCP-B 34, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses 37. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several states that can be described in terms of engine states comprising one of an engine-on state ('ON') and an engine-off state ('OFF'), and transmission operating range states comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input member 12.

In response to operator input via the accelerator pedal 113 and brake pedal 112 as captured by the user interface 13, the HCP 5 and one or more of the other control modules determine torque commands to control the torque actuators to meet the operator torque request at the output member 64 for transference to the driveline 90. The torque actuators preferably include a plurality of torque generating devices, e.g., the engine 14 and the first and second electric machines 56 and 72 and a torque transferring device comprising the transmission 10 in this embodiment. Based upon operator commands from the user interface 13, the HCP 5 determines the operator torque request and an output torque command from the transmission 10 to the driveline 90 and actuator controls including an input torque from the engine 14, clutch torques for the torque-transfer clutches C1 70, C2 62, C3 73, C4 75 of the transmission 10 and the motor torques for the first and second electric machines 56 and 72.

Figure 4:
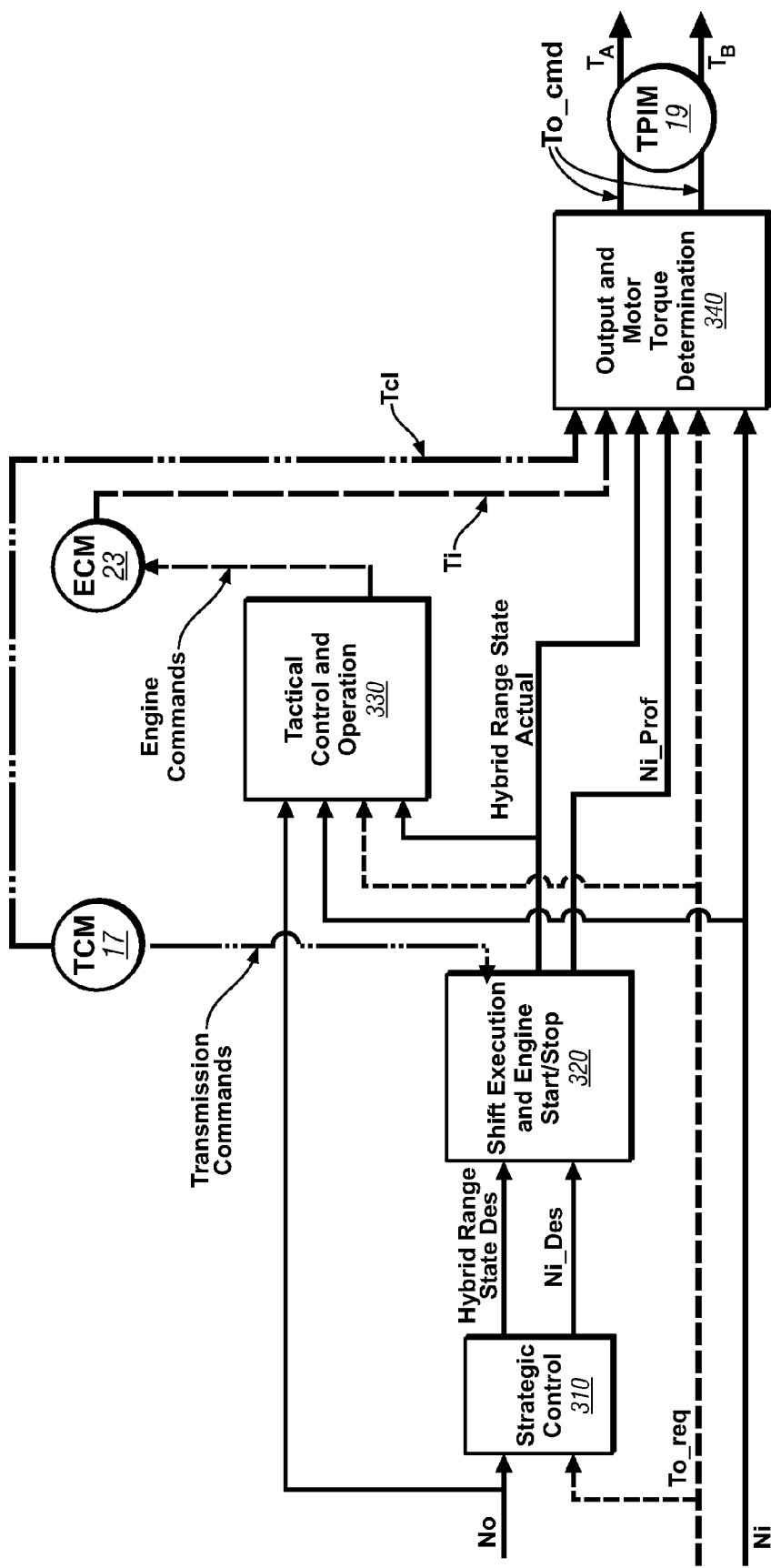
FIGS. 4 and 5 are schematic flow diagrams of a control scheme, in accordance with the present disclosure.

FIG. 4 shows an embodiment of an architecture to control and manage signal flow in a powertrain system including torque actuators comprising multiple torque generating devices and a torque transferring device to control and manage torque transfer and power flow. The architecture is described with reference to, but not limited by, the exemplary powertrain system of FIGS. 1, 2, and 3. The flow of signals through the control modules controls the torque generating devices and the torque transferring device. In operation, the operator inputs to the accelerator pedal 113 and the brake pedal 112 are monitored to determine the operator command comprising the operator torque request ('To_req'). Operation of the engine 14 and the transmission 10 are monitored to determine the input speed ('Ni') and the output speed ('No'). A strategic optimization control scheme ('Strategic Control') 310 determines a preferred input speed ('Ni_Des') and a preferred engine state and transmission operating range state ('Hybrid Range State Des') based upon the output speed and the operator torque request, and optimized based upon other operating parameters of the hybrid powertrain, including battery power limits and response limits of the engine 14, the transmission 10, and the first and second electric machines 56 and 72. The strategic optimization control scheme 310 is preferably executed by the HCP 5 during each 100 ms loop cycle and each 25 ms loop cycle.

The outputs of the strategic optimization control scheme 310 are used in a shift execution and engine start/stop control scheme ('Shift Execution and Engine Start/Stop') 320 to change the transmission operation ('Transmission Commands') including changing the operating range state. This includes commanding execution of a change in the operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle. The engine operating commands are based upon the input speed profile and the operator torque request during a transition in the operating range state of the transmission.

A tactical control scheme ('Tactical Control and Operation') 330 is repeatedly executed during one of the control loop cycles to determine engine commands ('Engine Commands') for operating the engine, including a preferred input torque from the engine 14 to the transmission 10 based upon the sensor inputs comprising output speed, the input speed, and the operator torque request and the present operating range state for the transmission. A clutch torque ('Tcl') for each clutch is estimated in the TCM 17, including the presently applied clutches and the non-applied clutches, and a present engine input torque ('Ti') reacting with the input member 12 is determined in the ECM 23. A motor torque control scheme ('Output and Motor Torque Determination') 340 is executed to determine the preferred output torque from the powertrain ('To_cmd'), which includes motor torque commands ('$T_A$', '$T_B$') for controlling the first and second electric machines 56 and 72 in this embodiment. The preferred output torque is based upon the estimated clutch torque(s) for each of the clutches, the present input torque from the engine 14, the present operating range state, the input speed, the operator torque request, and the input speed profile. The first and second electric machines 56 and 72 are controlled through the MCP-A 33 and MCP-B 34 to meet the preferred motor torque commands based upon the preferred output torque.

Figure 5:
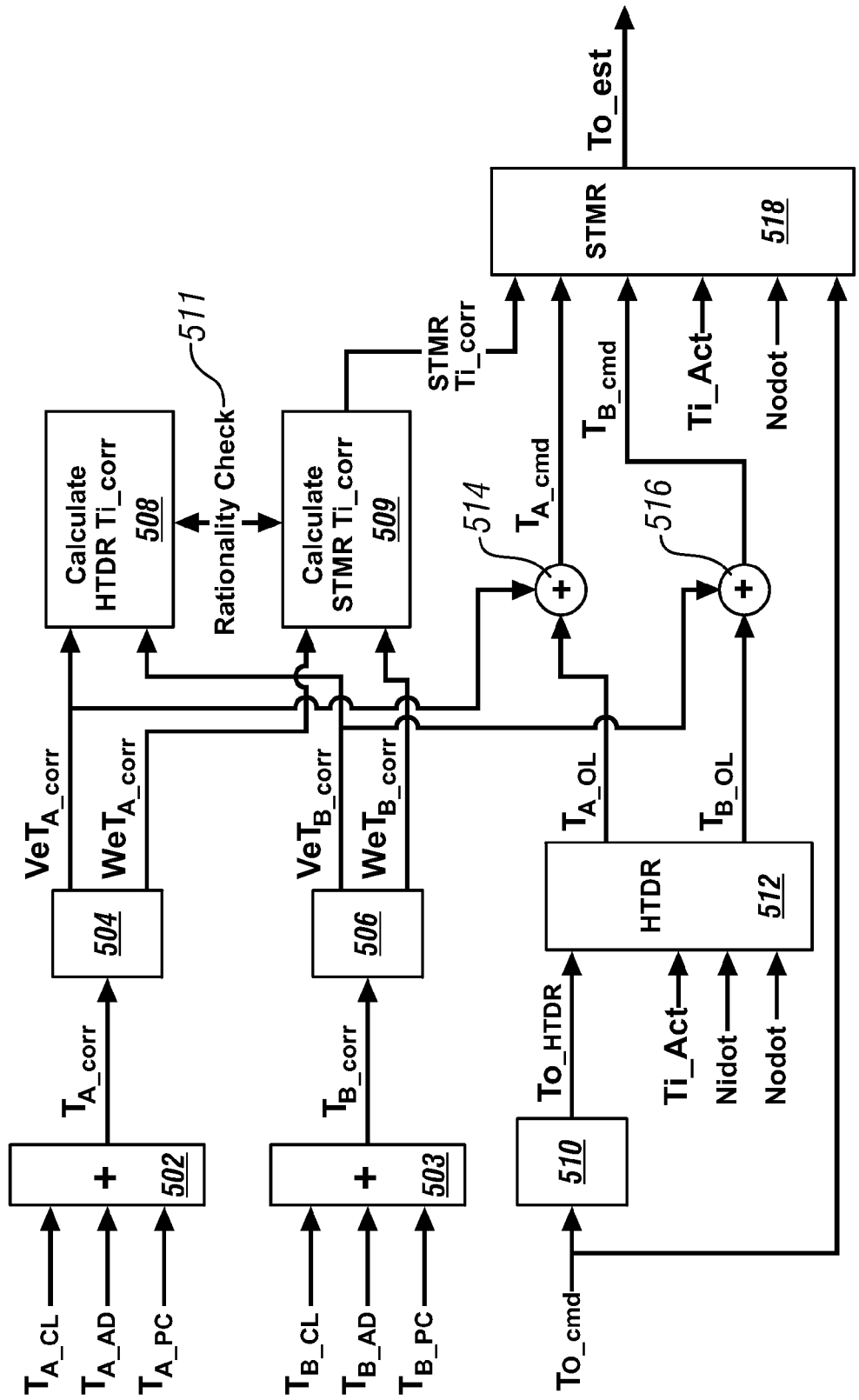

FIG. 5 shows details of signal flow to determine and monitor and secure signal integrity of the motor torque commands ('$T_A$', '$T_B$') for controlling the first and second electric machines 56 and 72 in this embodiment, to achieve an output torque command ('To_cmd'). The output torque command is subjected to shaping constraints (510) in the form of low pass filtering of the signal and other signal shaping techniques that increase stability in the output torque command. The output torque command is one of several signals input to a first motor torque determination algorithm ('HTDR') (512) to calculate open-loop motor torques for the first and second electric machines 56 and 72 ('$T_{A\_OL}$', '$T_{B\_OL}$'). The other signal inputs include the presently achieved input torque ('Ti_Act'), which can be estimated, an acceleration rate of the input member 12 ('Nidot'), and an acceleration rate of the output member 64 ('Nodot'). The first motor torque determination algorithm 512 calculates the open-loop motor torques for the first and second electric machines 56 and 72 ('$T_{A\_OL}$', '$T_{B\_OL}$'), preferably using Eq. 1 as a governing equation:

$$\begin{bmatrix} T_A \\ T_B \end{bmatrix} = [A] \begin{bmatrix} Nidot \\ Nodot \\ Ti\_Act \\ To\_cmd \end{bmatrix} \quad [1]$$

wherein [A] is a 2×4 matrix of scalar values specific to an embodiment of the powertrain system described herein, and the open-loop motor torques for the first and second electric machines 56 and 72 ('$T_{A\_OL}$', '$T_{B\_OL}$') used as the $T_A$ and $T_B$ values.

A correction factor for each of the motor torque commands can be determined. The correction factors comprise adjustments to the motor torque commands based upon autonomic operations of the powertrain system, i.e., functionally independent operations that can be separate from immediate operation of the powertrain that are responsive to the operator torque request to achieve the output torque command. The correction factors preferably include closed-loop correction factors ('$T_{A\_CL}$', '$T_{B\_CL}$') that can be determined based upon the input speed ('Ni') and the input speed profile ('Ni_Prof'). The correction factors preferably include damping correction factors ('$T_{A\_AD}$', '$T_{B\_AD}$') to adjust the motor torques based upon a lash state of the components of the driveline 90, as transferred through the output member 64. The motor torques can be adjusted to reduce driveline jerks at low speeds, mitigate aggressive operator torque request maneuvers, and accommodate changes in direction of commanded output speed that induce driveline gear lash. The correction factors include pulse cancellation correction factors ('$T_{A\_PC}$', '$T_{B\_PC}$') that adjust the motor torques based upon periodic pulsations in the input torque due to in-cylinder pressure pulses during engine operation that are introduced to the input member 12. The correction factors are arithmetically combined (502, 503) to determine motor torque corrections ('$T_{A\_corr}$', '$T_{B\_corr}$') for the first and second electric machines 56 and 72. The motor torque corrections ('$T_{A\_corr}$', '$T_{B\_corr}$') are verified, secured and rationalized, and then combined with the open-loop motor torques ('$T_{A\_OL}$', '$T_{B\_OL}$') to determine the motor torque commands ('$T_{A\_cmd}$', '$T_{B\_cmd}$') which are used for controlling the first and second electric machines 56 and 72.

The motor torque corrections ('$T_{A\_corr}$', '$T_{B\_corr}$') are secured by executing a dual-store function (504, 506). The dual-store function includes generating redundant data comprising primary motor torque correction signals ('Ve $T_{A\_corr}$', 'Ve $T_{B\_corr}$') and secondary motor torque correction signals ('We $T_{A\_corr}$', 'We $T_{B\_corr}$'). A dual-store check is executed preferably prior to storing the primary and secondary signals at first and second memory locations. The dual-store check includes monitoring and comparing present contents in the first and second memory locations to verify integrity of the memory locations. If there is a difference between the present contents of the memory locations, a fault is recorded indicating corruption of the memory locations and remedial action is undertaken consistent with the specific signal. When the dual-store check indicates the present contents in the first and second memory locations are identical, the motor torque correction signals are dual-stored, i.e., the motor torque corrections ('$T_{A\_corr}$', '$T_{B\_corr}$') are stored as the primary motor torque correction signals ('Ve $T_{A\_corr}$', 'Ve $T_{B\_corr}$') in first memory locations and are stored as secondary motor torque correction signals ('We $T_{A\_corr}$', 'We $T_{B\_corr}$') in second memory locations in one of the memory devices. The primary signal stored in the first memory location is preferably subsequently communicated to a control path and the redundant signal stored in the second memory location is preferably subsequently communicated to a security path. When the dual-store check indicates a fault in one of the present contents in the first and second memory locations, the control system determines whether the fault has matured ('Mature Fault'), and executes remedial action to mitigate risks associated with presence of the fault.

The primary motor torque correction signal for the first electric machine 56 ('Ve $T_{A\_corr}$') is coupled with the primary motor torque correction signal for the second electric machine 72 ('Ve $T_{B\_corr}$') to calculate a first input torque correction ('HTDR Ti_corr'), which is preferably determined as described herein using Eq. 1, above. The first input torque correction is preferably calculated using Eq. 1, above, with the primary motor torque correction signal for the first electric machine 56 and the secondary motor torque correction signal for the second electric machine 72 used as the $T_A$ and $T_B$ values in the equation (508). A second input torque correction ('STMR Ti_corr') is calculated, preferably using Eq. 1, above (509), with the secondary motor torque correction signal for the first electric machine 56 ('We $T_{A\_corr}$') and the secondary motor torque correction signal for the second electric machine 72 ('We $T_{B\_corr}$') used as the $T_A$ and $T_B$ values in the equation in a second control path.

The first input torque correction ('HTDR Ti_corr') is compared to the second input torque correction ('STMR Ti_corr') using a rationality check (511). When the rationality check indicates the present contents in the first and second memory locations are the same, or within a predetermined threshold, the second input torque correction is input to a second algorithm, comprising an output torque determination algorithm operative to estimate output torque algorithm (518).

The primary motor torque correction signals ('Ve $T_{A\_corr}$', 'Ve $T_{B\_corr}$') are added to the open-loop motor torques for the first and second electric machines 56 and 72 ('$T_{A\_OL}$', '$T_{B\_OL}$'), respectively (514, 516) to determine the motor torque commands ('$T_{A\_cmd}$', '$T_{B\_cmd}$') which are used for controlling the first and second electric machines 56 and 72.

The motor torque command signals ('$T_{A\_cmd}$', '$T_{B\_cmd}$') are input to the second motor torque determination algorithm (518). The output torque determination algorithm monitor inputs and executes a second equation, Eq. 2:

$$\text{To\_est} = [B] \begin{bmatrix} Nodot \\ T_A \\ T_B \\ Ti \end{bmatrix} \quad [2]$$

wherein inputs $T_A$ and $T_B$ for Eq. 2 are the motor torque commands ('$T_{A\_cmd}$', '$T_{B\_cmd}$') which are used for controlling the first and second electric machines 56 and 72, and Nodot comprises the acceleration rate of the output member 64. The Ti term in Eq. 2 comprises a sum of the presently achieved input torque ('Ti_Act') and the second input torque correction ('STMR Ti_corr'). The [B] term comprises a 1×4 matrix of scalar values specific to an embodiment of the powertrain system described herein. The output torque determination algorithm executes Eq. 2 to estimate the output torque ('To_est') based upon the aforementioned inputs.

The motor torque commands can be verified by comparing the commanded output torque and the estimated output torque to determine whether they are equal within an allowable threshold. In one embodiment, the preferred or commanded output torque from the powertrain ('To_cmd') is adjusted with the second input torque correction ('STMR Ti_corr'), and compared to the estimated output torque ('To_est'). Specifically, Eq. 3 governs the relationship in one embodiment:

$$To\_est = To\_cmd + To\_corr + A * STMR\ Ti\_corr \quad [3]$$

wherein To_corr can be determined from the motor torque commands ('$T_{A\_cmd}$', '$T_{B\_cmd}$'), and A is a scalar value specific to the selected operating range state. The motor torque commands are verified when the relationship described with reference to Eq. 3 is valid, and thus the motor torque commands can be considered valid, and thus useable. Thus, the primary signal path to determine the motor torque commands ('$T_{A\_cmd}$', '$T_{B\_cmd}$') using the first motor torque determination algorithm 512 can be verified using the secondary, or redundant signal path comprising the output torque determination algorithm to estimate output torque algorithm (518) including adjustments to the motor torque commands based upon autonomic operations of the powertrain system. This action increases robustness of the operation system and reduces likelihood of incorrectly identifying a system fault. However, when the motor torque commands are not verified, i.e., the estimated output torque is not equal to or within an allowable error from the combination of the commanded output torque from the powertrain, the control system can identify a fault, and mitigating action occurs.

Torque security of the hybrid powertrain system can be achieved by executing integrity tests of the control system which include monitoring hardware integrity of the control system, including the wiring harnesses (not shown), communications links, sensors and actuators that monitor and control operation of the powertrain system. Torque security can be achieved by monitoring integrity of algorithms and memory devices, securing and monitoring signal integrity during communications within a control module and communications between the control modules, monitoring integrity of the individual control modules and processors, and executing remedial actions. Torque security in the presence of an observed fault can include limiting an actuator command signal. This can include maximum and minimum limits on actuator command signals, and maximum rates of change on actuator command signals. Specifically, motor torque commands $T_A$ and $T_B$ can be limited to maximum and minimum motor torques, and changes in the motor torque commands $T_A$ and $T_B$ can be limited to effect a maximum rate of change in output torque, e.g., 0.2 g.

Securing and monitoring signal integrity is preferably accomplished by individually securing the control modules and securing the serial communications links between the control modules. The distributed control module system of the embodiment preferably includes each of the torque actuators controlled by a separate control module. This embodiment includes the ECM 23 that monitors sensors and control actuators of the engine 14, the TCM 17 that monitors sensors and control actuators of the transmission 10, the MCP-A 33 that monitors sensors and control actuators of the first electric machine 56, and the MCP-B 34 that monitors sensors and control actuators of the second electric machine 72. The HCP 5 monitors inputs from and commands operation of the ECM 23, TCM 17, MCP-A 33 and MCP-B 34. The control modules communicate the signals using the LAN bus 6 and the SPI bus 37. Each of the ECM 23, MCP-A 33, MCP-B 34 and TCM 17, is responsible for closed loop monitoring and self-security based on secured commands received from the HCP 5.

Detection of a fault in communications can include detecting missing data, detecting corrupted data, and no data. Detecting missing data includes detecting loss of a message frame and taking a short term mitigation action and informing the receiving control module that no new data is available. Detecting no data includes detecting a long term loss of communications to one of the control modules and taking a remedial action.

Remedial action can be actuator-specific or across the entire control system, and preferably places the powertrain in a torque-safe state. The remedial action includes storing an OBD compliant code for subsequent retrieval. A diagnostic may preliminarily identify a fault pending, meaning an inconsistency has been detected but the fault maturation algorithm has not reached its threshold. The hardware integrity can be further determined using diagnostics software that monitors the sensors and actuators of the control system.

When missing data is detected during communications, the control module can enter a fail-soft mode, wherein torque commands are initially held unchanged, i.e., at steady-state torque levels for a predetermined period of time and then ramped down toward zero torque command. The control modules continue to communicate, and when valid communications are reestablished, torque commands can be ramped up to achieve the operator torque request, with rate-change of the output torque controlled to effect the previously described maximum rate of change in output torque, e.g., 0.2 g. When loss of communications is permanent, powertrain operation can be transformed to a degraded state that limits output torque to a predetermined maximum level, preferably permitting some level of operation for the key cycle.

When a fault is detected in data store as indicated by corruption of the redundantly stored signals, fault mitigation can include disabling the actuator controlled by the respective control module in which the corruption occurred.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method to monitor signal integrity in a control module for a hybrid powertrain system including a transmission and a plurality of torque generating machines connected to an energy storage device, the transmission operative to transfer power between an input member and the torque generating machines and an output member, wherein the control module performs the following steps comprising:
   determining an output torque command;
   calculating motor torque commands for the torque generating machines based upon the output torque command;
   determining torque corrections for the motor torque commands;
   adjusting the motor torque commands based upon the torque corrections for the motor torque commands;
   determining an input torque correction based upon the torque corrections for the motor torque commands;
   determining an actual input torque to the input member;
   estimating an output torque based upon the actual input torque, the input torque correction, and the adjusted motor torque commands; and
   comparing the estimated output torque and the output torque command.

2. The method of claim 1, further comprising verifying integrity of the torque corrections for the motor torque commands prior to adjusting the motor torque commands based upon the torque corrections for the motor torque commands.

3. The method of claim 2, wherein verifying integrity of the torque corrections comprises redundantly storing the torque corrections at first and second memory locations in a memory device of the control module.

4. The method of claim 3, further comprising comparing data stored at the first and second memory locations in the memory device of the control module.

5. The method of claim 1, wherein the torque corrections for the motor torque commands comprise closed loop torque corrections based upon output speed.

6. Method to monitor signal integrity in a control module for a hybrid powertrain system including a transmission and a plurality of torque generating machines connected to an energy storage device, the transmission operative to transfer power between an input member and the torque generating machines and an output member, wherein the control module performs the following steps comprising:
   determining an output torque command;
   calculating motor torque commands for the torque generating machines based upon the output torque command;
   determining torque corrections for the motor torque commands;
   adjusting the motor torque commands based upon the torque corrections for the motor torque commands;
   determining an input torque correction based upon the torque corrections for the motor torque commands;
   determining an actual input torque to the input member;
   estimating an output torque based upon the actual input torque, the input torque correction, and the adjusted motor torque commands; and
   comparing the estimated output torque and the output torque command;
   wherein the torque corrections for the motor torque commands comprise closed loop torque corrections based upon output speed; and
   wherein the torque corrections for the motor torque commands further comprise torque corrections for actively damping driveline pulsations.

7. Method to monitor signal integrity in a control module for a hybrid powertrain system including a transmission and a plurality of torque generating machines connected to an energy storage device, the transmission operative to transfer power between an input member and the torque generating machines and an output member, wherein the control module performs the following steps comprising:
   determining an output torque command;
   calculating motor torque commands for the torque generating machines based upon the output torque command;
   determining torque corrections for the motor torque commands;
   adjusting the motor torque commands based upon the torque corrections for the motor torque commands;
   determining an input torque correction based upon the torque corrections for the motor torque commands;
   determining an actual input torque to the input member;
   estimating an output torque based upon the actual input torque, the input torque correction, and the adjusted motor torque commands; and
   comparing the estimated output torque and the output torque command;
   wherein the torque corrections for the motor torque commands comprise closed loop torque corrections based upon output speed; and
   wherein the torque corrections for the motor torque commands further comprise torque corrections for engine pulse cancellation.

8. A method to monitor integrity of a signal in a distributed control module system operative to control an electro-mechanical transmission, the transmission operative to transfer power between an input member and a plurality of torque generating machines and an output member, wherein the distributed control module system performs the following steps comprising:
   calculating motor torque commands for the torque generating machines based upon an output torque command;
   determining torque corrections for the motor torque commands;
   adjusting the motor torque commands based upon the torque corrections for the motor torque commands;
   determining an input torque correction based upon the torque corrections for the motor torque commands;
   determining an actual input torque to the input member;
   estimating an output torque based upon the actual input torque, the input torque correction, and the adjusted motor torque commands;
   adjusting the estimated output torque based upon the input torque correction; and
   comparing the estimated output torque and the output torque command.

9. A method to monitor integrity of a motor torque command in a distributed control module system operative to control an electro-mechanical transmission, the transmission operative to transfer power between an input member and a plurality of torque generating machines and an output member, wherein the distributed control module system performs the following steps comprising:
   calculating motor torque commands for the torque generating machines based upon an output torque command;
   determining torque corrections for the motor torque commands;
   adjusting the motor torque commands based upon the torque corrections for the motor torque commands;
   determining an input torque correction based upon the torque corrections for the motor torque commands;
   estimating an output torque based upon an actual input torque, the input torque correction, and the adjusted motor torque commands; and
   verifying the adjusted motor torque commands based upon the output torque command and the estimated output torque.

10. The method of claim 9, wherein verifying the adjusted motor torque commands comprises adjusting the estimated output torque based upon the input torque correction and comparing the adjusted estimated output torque and the output torque command.

11. The method of claim 9, further comprising securing integrity of the adjusted motor torque commands for the torque generating machines by comparing data stored at first and second memory locations in a memory device for each of the torque generating machines and then redundantly storing the adjusted motor torque commands at the first and the second memory locations.

12. A method to monitor integrity of a motor torque command in a distributed control module system operative to control a powertrain system including an electro-mechanical transmission, the transmission operative to transfer power between an input member and a plurality of torque generating devices and an output member, wherein the distributed control module system performs the following steps comprising:
   determining an input torque;
   executing a first algorithm to determine motor torque commands for the torque generating devices based upon the input torque and an output torque command;
   determining torque corrections for the motor torque commands for the torque generating devices based upon autonomic operation of the powertrain system;
   determining adjusted motor commands for each of the torque generating devices based upon the torque corrections;
   determining an input torque correction based upon the torque corrections for the torque generating devices;

executing a second algorithm to estimate an output torque based upon the input torque, the input torque correction and the adjusted commands for each of the torque generating devices; and comparing the output torque command and the estimated output torque.

13. The method of claim 12, comprising operating the torque generating devices based upon the adjusted commands for the torque generating devices.

* * * * *